US006985234B2

(12) United States Patent
Anderson

(10) Patent No.: US 6,985,234 B2
(45) Date of Patent: *Jan. 10, 2006

(54) SWEPT WAVELENGTH METER

(75) Inventor: Duwayne R. Anderson, St. Helens, OR (US)

(73) Assignee: Thorlabs, Inc., Newton, NJ (US)

( * ) Notice: Subject to any disclaimer, the term of this patent is extended or adjusted under 35 U.S.C. 154(b) by 354 days.

This patent is subject to a terminal disclaimer.

(21) Appl. No.: 10/155,383

(22) Filed: May 24, 2002

(65) Prior Publication Data

US 2002/0163646 A1     Nov. 7, 2002

Related U.S. Application Data

(63) Continuation-in-part of application No. 09/774,433, filed on Jan. 30, 2001, now Pat. No. 6,570,894.

(51) Int. Cl.
    *G01B 9/02* (2006.01)
(52) U.S. Cl. ..................................... 356/477
(58) Field of Classification Search ............... 356/73.1, 356/477, 480, 519, 364; 250/227.19, 227.27; 385/12; 372/32, 29.02
    See application file for complete search history.

(56) References Cited

U.S. PATENT DOCUMENTS

| | | | |
|---|---|---|---|
| 4,595,292 A | | 6/1986 | Amodeo et al. |
| 4,823,354 A | * | 4/1989 | Znotins et al. ............... 372/32 |
| 5,780,843 A | | 7/1998 | Cliché et al. |
| 6,097,487 A | * | 8/2000 | Kringlebotn et al. ....... 356/519 |
| 6,542,523 B1 | | 4/2003 | Funakawa |
| 6,570,894 B2 | * | 5/2003 | Anderson .................... 372/32 |
| 6,633,371 B1 | * | 10/2003 | Lu et al. ...................... 356/72 |
| 6,717,967 B2 | * | 4/2004 | Cliche et al. ................. 372/32 |

FOREIGN PATENT DOCUMENTS

| | | |
|---|---|---|
| EP | 0 859 477 A2 | 8/1998 |
| EP | 1 099 943 A1 | 5/2001 |
| EP | 1 172 637 A1 | 1/2002 |
| JP | 8-304084 A | 11/1996 |
| JP | 11-220198 A | 8/1999 |

OTHER PUBLICATIONS

Office Action issued by the Patent Office of People's Republic of China on Apr. 22, 2005 in Patent Application No. 02103207.6 (with translation).

* cited by examiner

*Primary Examiner*—Samuel A. Turner
(74) *Attorney, Agent, or Firm*—Finnegan, Henderson, Farabow, Garrett & Dunner, L.L.P.

(57) ABSTRACT

A swept wavelength meter provides a real-time wavelength calibration scheme for a swept laser. The calibration scheme generates an electrical signal from a swept optical output of the swept laser that is cyclical with respect to the wavelength of the swept optical output over a defined range of wavelengths. The point on the electrical signal at any given time provides an accurate phase for the swept optical output at that point. The electrical signal in turn is calibrated by generating calibration references from the swept optical output using known absorption lines within the defined range of interest. The wavelength of the swept laser is calibrated as a function of a reference wavelength from the known absorption lines and the phase at the given point. Simultaneously forward and reflective measurements may be taken, with the forward measurement being used as a normalizing measurement for determining insertion and return loss automatically for a device under test.

29 Claims, 4 Drawing Sheets

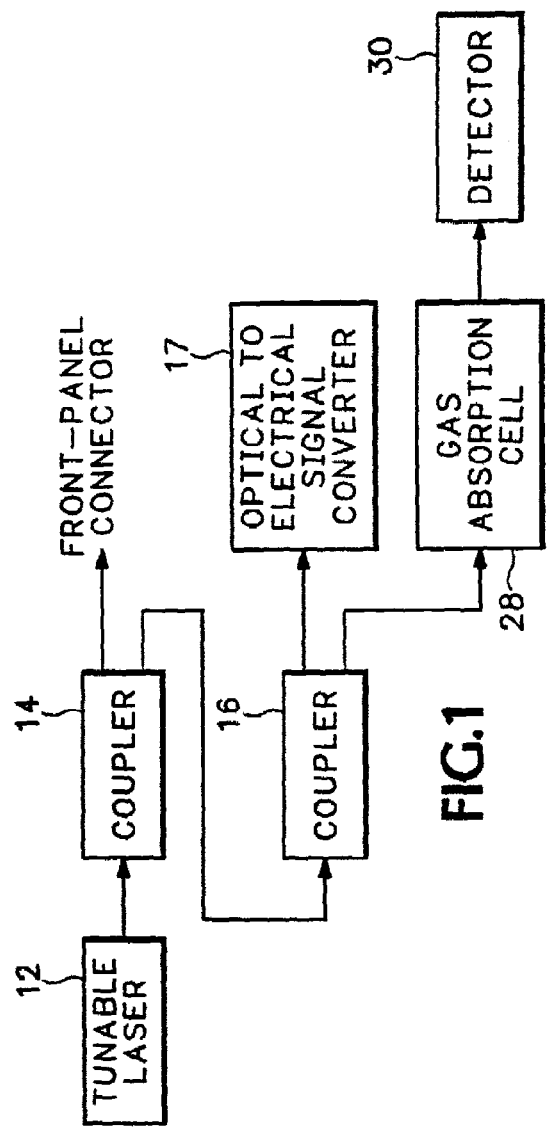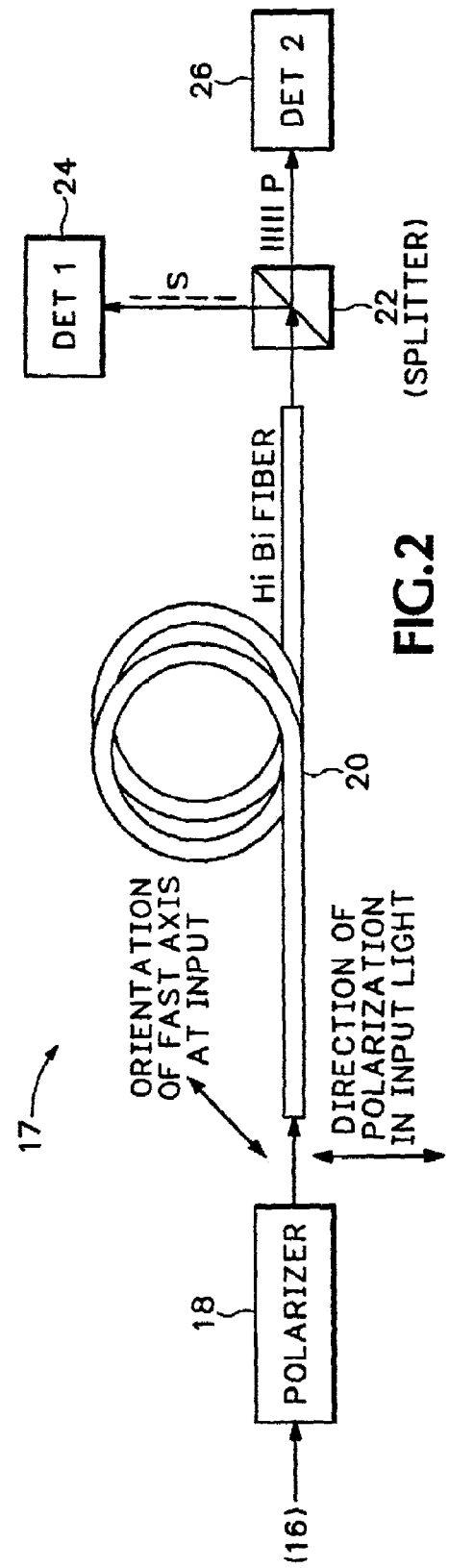

US 6,985,234 B2

SWEPT WAVELENGTH METER

CROSS-REFERENCE TO RELATED APPLICATIONS

This is a continuation-in-part of pending U.S. patent application Ser. No. 09/774,433 filed Jan. 30, 2001, now U.S. Pat. No. 6,570,894.

BACKGROUND OF THE INVENTION

The present invention relates to swept lasers, and more particularly to a swept wavelength meter for providing simultaneously wavelength calibration of a tunable laser as well as normalizing measurements for insertion and return loss determinations.

Photonic networks have seen a virtual explosion in complexity as more and more enabling components become commercially available. Many of these components are active, such as distributed feedback (DFB) lasers and erbium-doped fiber amplifiers (EDFAs). Other components are passive, such as multiplexers/demultiplexers and fiber Bragg gratings (FBGs). Often the characteristic of greatest interest in these passive components is their spectral transmission and/or reflectivity.

To measure the spectral characteristics of passive optical components, the industry has settled on two different techniques. One uses a broadband (spectrally bright) source to illuminate the component at the input and measures the spectral content of the light that is either transmitted or reflected by using an optical spectrum analyzer (OSA). The other technique uses a tunable laser as input to the passive component and a broadband detector, such as a power meter, on the output. As the laser's wavelength changes as measured by a wavelength meter, the power meter records differences in intensity and thus measures the wavelength-dependent transmission or reflectivity of the component.

Of these two techniques the tunable laser offers the best spectral resolution and dynamic range. Because of this it is becoming widely believed that the tunable laser method is the one most likely to succeed, though problems still remain. One of the most important problems is to achieve rapid, yet accurate, wavelength calibration of the tunable laser. The most common configuration for this test bundles the tunable laser with a standard wavelength meter that is based on a Michelson interferometer. In this scenario the laser increments its wavelength and stops. The power meter reads the optical power and the wavelength meter measures the wavelength, and the process repeats for each wavelength step within the wavelength range of the laser.

The primary issue for this scenario is the time required to measure the wavelength with the wavelength meter. A typical Michelson interferometer needs many thousands of fringes to make an accurate wavelength measurement. Scanning this many fringes might take more than 50 milliseconds to acquire. Then the wavelength meter must take the fast Fourier transform (FFT) of the fringes and calculate the wavelength—a process that might take another 50 milliseconds, for example. In this illustration it takes about 0.1 second to measure the wavelength of the tunable laser.

If the spectral characteristics of a passive component are tested over a range of 2 nanometers (2,000 picometers) and the wavelength is indexed in 2 picometer steps, the laser is stepped 1000 times and each step requires 0.1 second to perform the wavelength calibration. The total test time is about 100 seconds or 1.67 minutes. Scanning with 1 picometer resolution doubles the time, and if the scan is extended over a range of 20 nanometers the time increases an additional ten-fold. A 100 nanometer range scan would require 2.78 hours! To test hundreds or thousands of such passive components results in the test station becoming a bottleneck that limits production rates. After calibrating the laser at the beginning of a use period, the laser is swept without the wavelength meter for a while before recalibrating. The results are not as accurate as calibrating before each sweep, but it is a compromise between the time required for calibration and the desired accuracy of the results.

Further to perform normalizing measurements for insertion and return loss determinations has required building forward and reflective measurements from separate test equipment and modules, which may be inconvenient to a user.

Therefore what is needed is a swept wavelength meter that provides accurate wavelength calibration for a tunable laser while simultaneously providing normalizing measurements for insertion and return loss determinations automatically as part of a regular test setup.

BRIEF SUMMARY OF THE INVENTION

Accordingly the present invention provides a swept wavelength meter for near real-time wavelength calibration of tunable, swept lasers by generating from a swept optical output an electrical signal that is cyclical with wavelength, and by calibrating the electrical signal using known absorption lines within a defined range of wavelengths. One way to calibrate the swept lasers is to input the swept optical output into a polarizer that is coupled to one end and oriented at forty-five degrees to the eigen modes of a highly birefringent section of fiber. The other end of the highly birefringent fiber is coupled to a polarizing beam splitter which separates the orthogonally polarized modes. The outputs from the beam splitter are detected and the electrical outputs are composited to form the cyclical electrical signal. Another way to generate the cyclical electrical signal is to input the swept optical output into an unbalanced interferometer having a pair of unequal path lengths. The outputs from the two paths are input via a coupler to an optical receiver to obtain the cyclical electrical signal. For either way any point on the cyclical electrical signal corresponds accurately to the wavelength of the swept optical output at that point. In a parallel path a gas absorption cell containing a gas with known spectral absorption lines within the defined range of wavelengths receives the swept optical output and the spectral lines are detected by a detector to produce calibration references for the cyclical electrical signal at known wavelengths. Other points on the cyclical electrical signal are calibrated by interpolation between the known calibration references based on the phase difference between known spectral lines and the phase difference between the first known spectral line to the point desired.

Further the swept wavelength meter includes additional detectors and couplers to also automatically and simultaneously build forward normalizing measurements for insertion and return loss determinations.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 1 is a block diagram view of a portion of a swept wavelength meter for accurate wavelength calibration according to the present invention.

FIG. 2 is a block diagram view of a loop of polarization-maintaining fiber for generating an electric signal cyclical with swept laser wavelength according to the present invention.

DETAILED DESCRIPTION OF THE INVENTION

Figure 3:
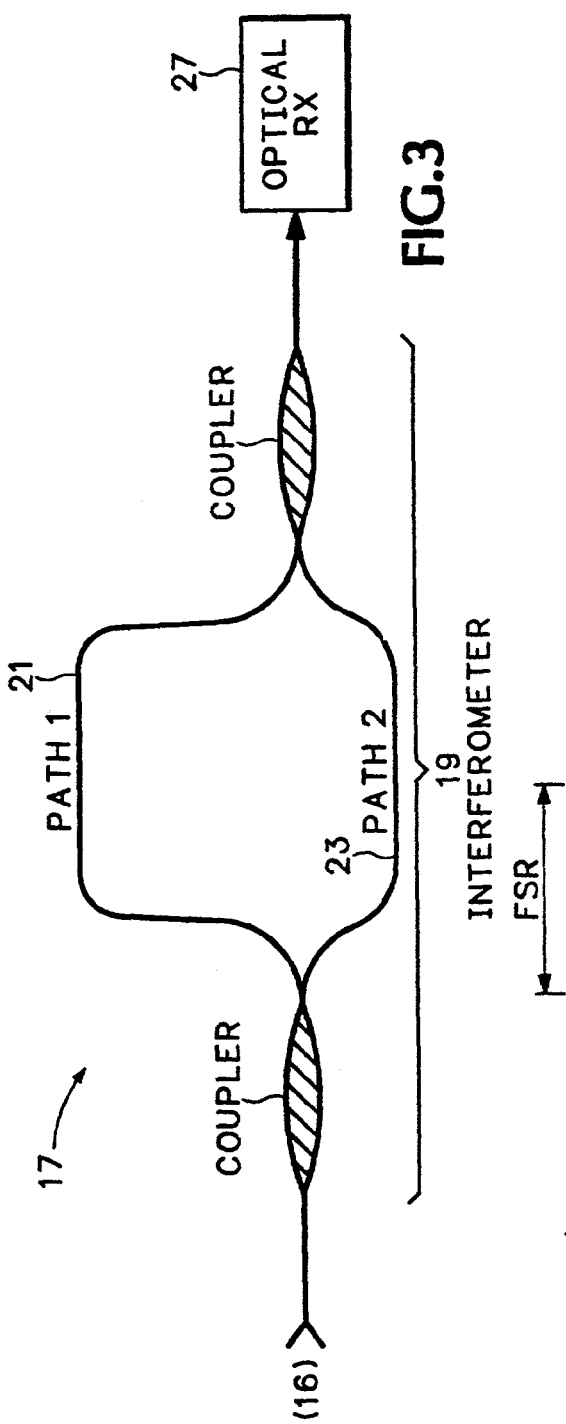
FIG. 3 is a block diagram view of an interferometer for generating the electric signal cyclical with swept laser wavelength according to the present invention.

Referring now to FIG. 1 a tunable, swept laser 12 provides a swept optical output to a first coupler 14 which provides the swept optical output to a front-panel connector and to a second coupler 16. The second coupler 16 provides the swept optical output to an optical to electrical signal converter 17 where the swept optical output is converted to an approximately sinusoidal cyclical electrical signal. One form of the optical to electrical signal converter 17 is shown in FIG. 2 where the swept optical output from the coupler 16 is input via a polarizer 18 to a section of highly birefringent (HiBi) fiber 20 that is designed to hold the state of polarization. The polarizer 18 is oriented so that it is 45° with respect to the eigen modes, or polarization axes, of the HiBi fiber 20. At the opposite end of the HiBi fiber 20 is a polarizing beam splitter 22 that also is oriented at 45° with respect to the polarization axes of the HiBi fiber. The HiBi fiber 20, in conjunction with the input polarizer 18 and the output polarizing beam splitter 22 with two detectors 24, 26 receiving the outputs from the splitter, provides an electrical signal that varies cyclically with wavelength and has a period of about 100 picometers, depending upon the length of the HiBi fiber.

Another way for implementing the optical to electrical signal converter 17 which is simpler, more stable and introduces less noise is to input the swept optical signal from the coupler 16 into an interferometer 19 as shown in FIG. 3. The interferometer 19 has a pair of paths 21, 23 of unequal lengths—unbalanced—such that the free spectral range (FSR) is approximately, for example, 80 picometers. The optical signal output from the interferometer 19 is input to an optical receiver 27. The output from the optical receiver 27 is an electrical signal that varies cyclically with wavelength having a period on the order of 100 picometers, depending upon the difference in the lengths of the paths 21, 23.

Returning now to FIG. 1 a gas absorption cell 28 also receives the swept optical output from the second coupler 16 and provides output to another detector 30 to provide calibration references for the cyclical electrical signal generated by the optical to electrical signal converter 17. Together these allow accurate, real-time picometer calibration of the wavelength of the swept optical output from the tunable laser 12.

The approach to the calibration is two-fold:
(1) Generate from the swept optical output an electrical signal that is cyclical with wave number, like having an encoder tied to the wavelength; and
(2) Calibrate the cyclical electrical signal using known spectral absorption lines from the gas absorption cell 28.

To see how the polarizing optical components 18, 22 and the HiBi fiber 20 generate the cyclical electrical signal as the wavelength changes, consider the Jones matrix representation of the optical system, as shown in FIG. 2. The Jones matrix for the light that is input to the HiBi fiber 20 after passing through the polarizer 18 is $$\begin{vmatrix} E \\ 0 \end{vmatrix}.$$

The Jones matrix for the HiBi fiber 20 is $$\begin{vmatrix} \cos(\varphi'(\lambda)) + SQRT(-1*\sin(\varphi'(\lambda))*\cos(2\theta)) & SQRT(-1*\sin(\varphi'(\lambda))*\sin(2\theta)) \\ SQRT(-1*\sin(\varphi'(\lambda))*\sin(2\theta)) & \cos(\varphi'(\lambda)) - SQRT(-1*\sin(\varphi'(\lambda))*\cos(2\theta)) \end{vmatrix}$$

where $\lambda$ is the wavelength of the light, $\phi'(\lambda)$ is half of the total phase delay between the fast and slow axes in the HiBi fiber 20, and $\theta$ is the angle between the input state of polarization and the fast axis of the HiBi fiber. The Jones matrix for the polarizing beam splitter 22 is $$\begin{vmatrix} 1 & 0 \\ 0 & 0 \end{vmatrix}$$

for one output and $$\begin{vmatrix} 0 & 0 \\ 0 & 1 \end{vmatrix}$$

for the other output. Combining the above equations the electrical field at the first leg of the polarizing beam splitter 22 is $$Eout1(\lambda) =$$

$$\begin{vmatrix} 1 & 0 \\ 0 & 0 \end{vmatrix} \begin{vmatrix} \cos(\varphi'(\lambda)) + SQRT(-1*\sin(\varphi'(\lambda))*\cos(2\theta)) & SQRT(-1*\sin(\varphi'(\lambda))*\sin(2\theta)) \\ SQRT(-1*\sin(\varphi'(\lambda))*\sin(2\theta)) & \cos(\varphi'(\lambda)) - SQRT(-1*\sin(\varphi'(\lambda))*\cos(2\theta)) \end{vmatrix} \begin{vmatrix} E \\ 0 \end{vmatrix}$$

Expanding this equation, multiplying by it's complex conjugate, setting θ=45° and simplifying produces $$Pout1 = E^2 \cos(\varphi'(\lambda))^2$$

Similarly for the second output from the polarizing beam splitter 22

$$Eout2 =$$

$$\begin{vmatrix} 0 & 0 \\ 0 & 1 \end{vmatrix} \begin{vmatrix} (\cos(\varphi'(\lambda)) + SQRT(-1*\sin(\varphi'(\lambda))*\cos(2\theta)) & SQRT(-1*\sin(\varphi'(\lambda))*\sin(2\theta)) \\ SQRT(-1*\sin(\varphi'(\lambda))*\sin(2\theta)) & \cos(\varphi'(\lambda)) - SQRT(-1*\sin(\varphi'(\lambda))*\cos(2\theta)) \end{vmatrix} \begin{vmatrix} E \\ 0 \end{vmatrix}$$

and $$Pout2 = E^2 \sin(\varphi'(\lambda))^2$$

The sum of the two output equations equals one, illustrating the assumption here of lossless ideal optical components. Since the detectors 24, 26 are square-law detectors, the electrical current is proportional to optical power. A composite signal is formed by subtracting the detector currents and then dividing by their sum $$Sig = (Pout1 - Pout2)/Pout1 + Pout2)$$
$$= (E^2\cos(\varphi'(\lambda))^2 - E^2\sin(\varphi'(\lambda))^2)/(E^2\cos(\varphi'(\lambda))^2 + E^2\sin(\varphi'(\lambda))^2)$$
$$= 2\cos(\varphi'(\lambda))^2 - 1$$

This represents a desirable situation since the output signal is now normalized, having values that vary sinusoidally between +1 and −1. The phase delay between the fast and slow axes of the HiBi fiber 20 is $$\phi(\lambda) = 2\pi L \Delta n/\lambda$$

where L is the physical length of the fiber, Δn is the difference between the index of the fast axis and the index of the slow axis and λ is the wavelength of the light in vacuum. Remembering that $\phi'(\lambda)=0.5\phi(\lambda)$ and defining the wave number, k, as $k=2\pi/\lambda$, substituting in the equation for Sig produces $$Sig = 2\cos(Lk\Delta n/2)^2 - 1$$

When plotted as a function of wave number the composite output signal is sinusoidal with period $K=2\pi/L\Delta n$.

Figure 4:
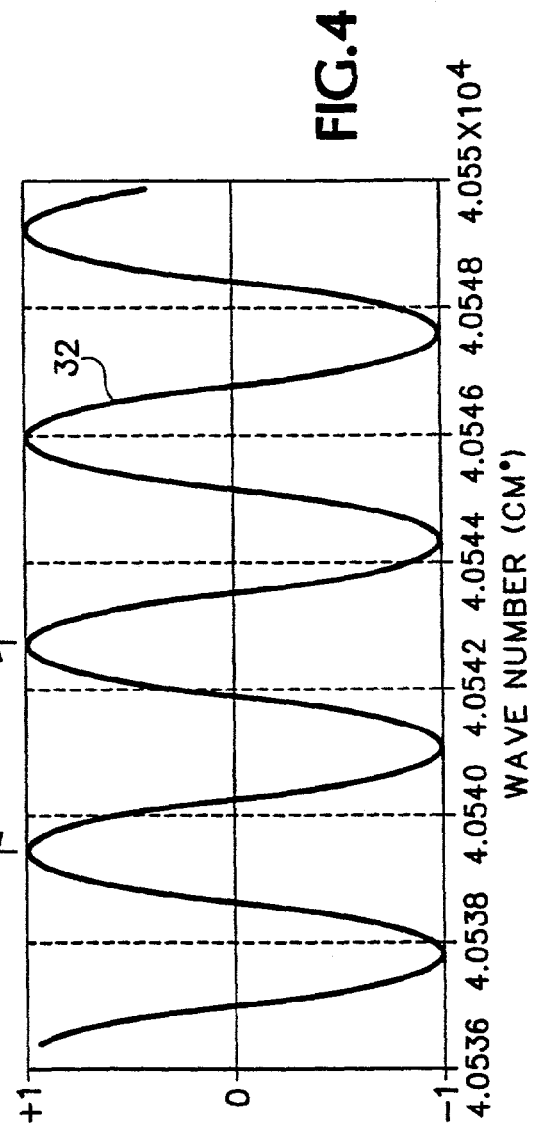
FIG. 4 is a graphic view of a sinusoidal output from the cyclical electrical signal generator according to the present invention.

FIG. 4 illustrates the composite signal 32 for a piece of HiBi fiber 20 that is 50 meters long and has a difference of 0.000388 between the index of the fast and the slow axes in the fiber. The FSR for this configuration is roughly 3.239 cm$^{-1}$, about 0.124 nanometers at 1550 nanometer wavelength. In scanning the laser over 100 nanometers there are approximately 800 cycles. A comparable signal is produced from the optical receiver 27 using the interferometer 19 shown in FIG. 3.

Likewise for the interferometer 19 of FIG. 3 the phase difference between the two paths 21, 23 is approximately $\phi=2\pi Ln/\lambda$ where L is the difference in length between the longer and shorter paths. The output from the interferometer 19 is $Sig=A_0^2 \cos^2(\pi Ln/\lambda)$, where $A_0$ is the signal input to the interferometer. Therefore the output of the interferometer 19 as a function of wave number (1/λ) is a simple sine-squared function.

Knowing the precise length of the fiber 20 as well as the difference in index between the eigen modes, or knowing the difference in lengths in the two paths 21, 23 of the interferometer 19, only a single point on the waveform needs to be calibrated, after which any other wavelength may be calibrated by counting cycles. However the length of the fiber 20 or paths 21, 23 changes with environmental conditions—temperature primarily—and Δn changes with both environmental conditions as well as wavelength. These changes may not be large under other conditions, but when calibrating to nanometer precision these effects cannot be ignored.

Figure 5:
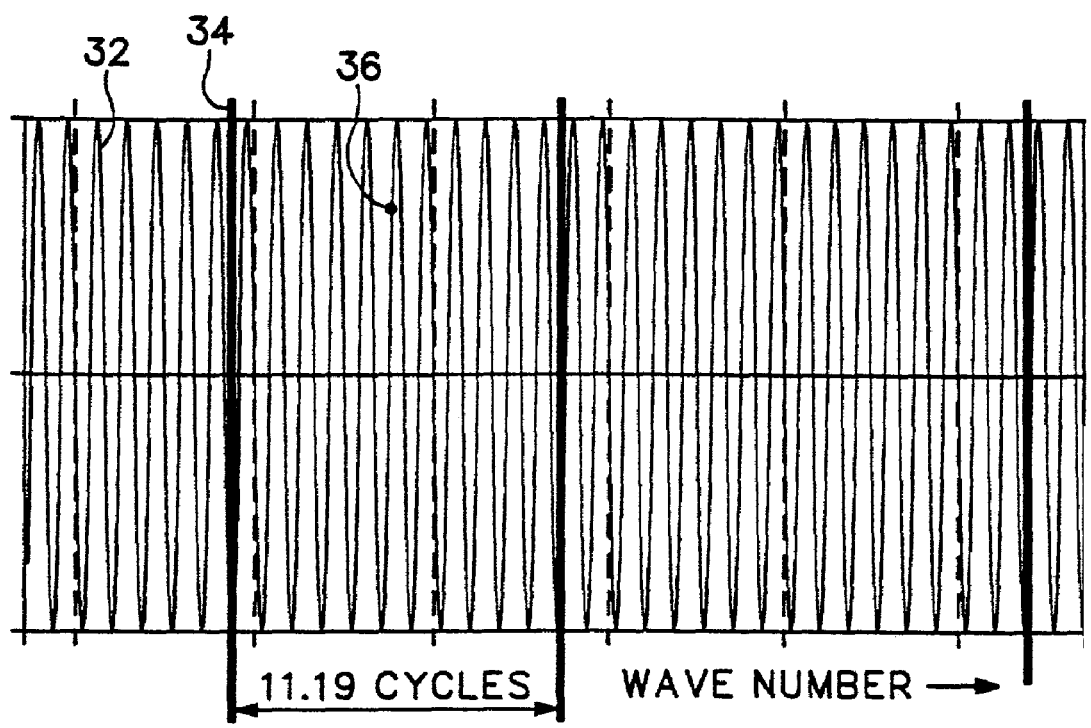
FIG. 5 is a graph view of the sinusoidal output superimposed with known absorption spectral lines according to the present invention.

This is where the second leg of the second coupler 16 comes in. The second leg has the gas absorption cell 28 containing, for example, acetylene or hydrogen cyanide. These gases have many absorption lines in near optical wavelengths of 1550 nanometers, and are ideal for calibration of sources used in telecommunications. FIG. 5 illustrates how the absorption spectra 34 may be used to calibrate the cyclical waveform 32 of FIG. 4. In this example the wavelength of a sample 36 indicated by the star is determined.

When the swept laser 12 scans, there is some sort of indicator that correlates the laser's position. This indicator may be steps from a stepper motor used to rotate a grating in the swept laser 12, or some other similar signal. The horizontal axis in FIG. 5 represents this signal from inside the swept laser 12. As this signal changes, the laser's wavelength changes in an unknown way, though hopefully designed to be as linear as possible. These changes in wavelength result in the approximately sinusoidally varying cyclical waveform 32 from the optical to electrical signal converter 17 as well as changes in optical power due to absorption in the gas absorption cell 28. The absorption lines 34 are at known wavelengths and, since they are associated with the cyclical waveform 32 through the coordinates along the horizontal axis, they may be used to calibrate the cyclical waveform.

Suppose that $k1_{known}$ and $k2_{known}$ represent two known wave numbers as determined from the locations of the absorption spectra 34. Suppose that $\Delta\phi_1$ is the phase between these two known wave numbers as determined by the cyclical waveform 32. In the example of FIG. 5 the left-most absorption line 34 has a wavelength of 1531.588 nanometers and the next absorption line to the right has a wavelength of 1530.976 nanometers, corresponding to the P(11) and P(10) lines in acetylene. By examining the cyclical waveform there are 11.19 cycles separating the two calibration wavelengths. Defining $\Delta\phi_2$ as the phase difference between the first known wave number from the absorption line spectra 34 and the unknown wave number that is desired, the wave number $k_{unknown}$ at the location of the sample 36 is determined.

$$k_{unknown} = k1_{known} + \Delta\phi_2((k2_{known} - k1_{known})/\Delta\phi_1)$$

For $k1_{known} = 41023.991$ cm$^{-1}$, $k2_{known} = 41040.391$ cm$^{-1}$, $\Delta\phi_1 = 11.19*2\pi$ and $\Delta\phi_2 = 5.14*2\pi$ reading from the phase differences in FIG. 5, then the unknown wave number of the sample 36 is 41031.524 cm$^{-1}$, which is 1531.307 nanometers. Using this algorithm the wave number, and thus the wavelength, of every point in the cyclical waveform 32 may be calibrated, which means that the wavelength at every step in the sweep of the tunable laser 12 may be calibrated.

To estimate the calibration error the difference between the known wave numbers is known with great accuracy, typically less than one picometer error, which means that the error resulting from calculating the unknown wave number depends upon the separation between the absorption lines 34 used for the calibration and the uncertainty with which phases may be measured. Techniques exist for measuring phases with great accuracy, and the separation between absorption lines 34 in acetylene and hydrogen cyanide cells is on the order of 0.5 nanometers. Thus the algorithm presented holds the potential for absolute calibration errors on the order of one picometer. The algorithm is most accurate when interpolating between absorption lines 34, but also is reasonably accurate in extrapolation as well so long as the cyclic characteristics of the electrical signal do not change much with the extrapolated wave number or during the time required to perform the sweep.

Optimum accuracy depends on having the swept laser 12 sweep as fast as possible while maintaining adequate signal-to-noise ratios (SNRs) in the detectors 24, 26, 30 and receiver circuitry. The optical loss between the swept laser 12 and these detectors 24, 26, 30 should be relatively low, on the order of 10 dB or less. This means that, if the laser's output is 1 dBm, then there should be −10 dBm at the detectors. To scan 10 nanometers in 0.1 second while sampling every picometer requires collecting roughly 10,000 samples in 0.1 second or 100 k samples per second. Therefore the bandwidth of the receiver circuitry should be on the order of 100 kHz. A well-designed receiver/detector front end may have −80 dBm noise-equivalent power with several hundred kHz bandwidth, so SNR should be about 70 dB. This is more than adequate for very precise phase measurements while keeping even the broadest spectral scans under one second, assuming the laser 12 can tune that fast.

Once the waveforms are acquired, they are calibrated. But this is a one-time process and is a relatively simple and straightforward algorithm as described above. A few seconds is probably adequate for the calculation given a reasonably capable digital signal processor (DSP). Thus the total time for a 30 nanometer scan with one picometer resolution and picometer accuracy may be accomplished in less than four or five seconds, which is a dramatic improvement in time over tunable lasers that are calibrated with a Michelson interferometer.

Figure 6:
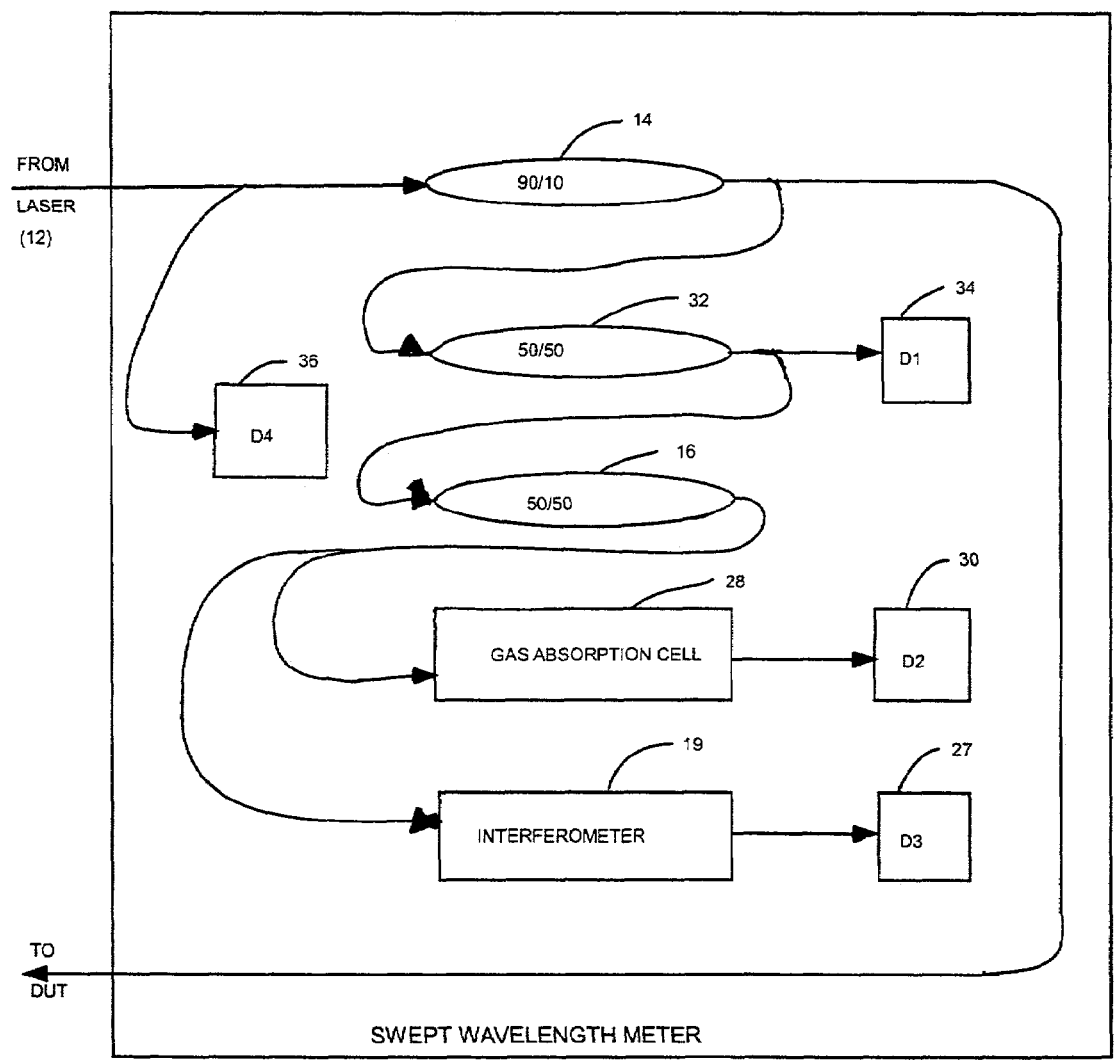
FIG. 6 is an illustrative view of a swept wavelength meter including forward and reflective measurements simultaneous with wavelength calibration according to the present invention.

Referring now to FIG. 6 a complete swept wavelength meter is shown. The light from the tunable laser 12 passes through the first coupler 14, which characteristically may divide the light 90/10 with the 90% passing on to a device under test (DUT) via the front-panel. The portion of the light from the first coupler is then passed through two subsequent 50/50 couplers 16, 32. The light from the third coupler 16 is processed as described above by the gas absorption cell 28 and detector (D2) 30 combination and the interferometer 19 and optical receiver (D3) 27 combination to provide the wavelength calibration. 50% of the light from the second coupler 32 is coupled to a forward detector (D1) 34 to simultaneously measure the forward light energy. Likewise reflected light energy from the DUT or front panel passes back through the first coupler 14 to a reflection detector (D4) 36 to simultaneously measure the reflected light energy. The forward light energy from D1 34 is used as a normalizing measurement for insertion and return loss determinations for the DUT.

For insertion loss determinations the swept optical output is input to the DUT and is measured at the output of the DUT by an appropriate optical power meter. The insertion loss is calculated from the ratio of the measured output power from the DUT to the transmitted swept optical output as determined by the forward optical power measurement, i.e., $$I.L. \approx 10*\log(DUT\_Output\_Optical\_Power/(Forward\_Optical\_Power))$$

where the Forward_Optical_Power is K*D1 (photodiode current). Likewise the return loss for the DUT is calculated from the ratio of the reflected optical power at D4 36 to the forward optical power measurement.

Thus the present invention provides a swept wavelength meter having a real-time wavelength calibrator for swept lasers which forms an electrical waveform that varies cyclically with wavelength for the swept laser and calibrates the cyclical electrical waveform with known absorption spectral lines so that a point on the cyclical waveform may be accurately determined as to its wavelength by interpolating between or extrapolating from the known absorption spectral lines, while simultaneously measuring the forward swept optical output as a normalizing measurement for use in determining insertion and return loss for a device under test.

What is claimed is:

1. A swept wavelength meter including a real-time wavelength calibration system for a swept laser comprising
   means for generating from a swept optical output of the swept laser an electrical signal that is cyclical with optical wavelength for the swept laser over a defined optical wavelength range such that the wavelength corresponding to each point of the electrical signal is accurately known;
   means for providing from the swept optical output a calibration reference for the electrical signal using known spectral absorption lines; and means for simultaneously obtaining from the swept optical output a normalizing measurement of forward energy.

2. The swept wavelength meter as recited in claim 1 further comprising means for simultaneously obtaining in response to the swept optical output a measurement of reflection energy.

3. The swept wavelength meter as recited in claim 1 wherein the generating means comprises:
an unbalanced interferometer with two optical paths of unequal length having the swept optical output from the swept laser as an input; and
means for converting an optical output from the unbalanced interferometer into the cyclical electrical signal.

4. The swept wavelength meter as recited in claim 1 wherein the generating means comprises:
a polarizer having as an input the swept optical output from the swept laser;
a highly birefringent section of fiber coupled at one end to an output of the polarizer such that the polarizer is oriented at forty-five degrees with respect to the eigen modes of the fiber;
a polarizing beam splitter coupled to the other end of the highly birefringent section of fiber oriented at forty-five degrees with respect to the eigen modes of the fiber; and
a pair of detectors, one coupled to each output of the polarizing beam splitter, to generate respective output electrical signals, the composite of which is the electrical signal.

5. The swept wavelength meter as recited in claim 1 wherein the providing means comprises:
a gas absorption cell containing a gas having known spectral absorption lines within the defined optical wavelength range, the gas absorption cell having an input coupled to receive the swept optical output from the swept laser; and
a detector for converting the known spectral absorption lines from the gas absorption cell into the calibration reference.

6. The swept wavelength meter as recited in claim 5 wherein the gas in the gas absorption cell includes acetylene or hydrogen cyanide.

7. The system as recited in claim 5 wherein the composite of the respective output electrical signals comprises the difference of the respective output electrical signals as the electrical signal.

8. The swept wavelength meter as recited in claim 1 further comprising means for calibrating the electrical signal with respect to wavelength using the known spectral absorption lines.

9. The swept wavelength meter as recited in claim 8 wherein the calibrating means comprises means for interpolating, between the known spectral absorption lines, the calibration of the electrical signal.

10. The swept wavelength meter as recited in claim 9 wherein the calibrating means further comprises means for extrapolating, from the known spectral lines, the calibration of the electrical signal.

11. A method of real-time wavelength calibration for a swept laser comprising the steps of:
generating from a swept optical output of the swept laser an electrical signal that is cyclical with optical wavelength for the swept laser over a defined optical wavelength range such that the wavelength corresponding to each point of the electrical signal is accurately known;
providing from the swept optical signal a calibration reference for the electrical using known spectral absorption lines; and
simultaneously obtaining from the swept optical output a normalizing measurement of forward energy.

12. The method as recited in claim 11 further comprising the step of simultaneously obtaining in response to the swept optical output a measurement of reflection energy.

13. The method as recited in claim 11 wherein the generating step comprises the steps of:
transmitting the swept optical signal through two parallel optical paths of unequal length in an unbalanced interferometer; and
converting the output of the unbalanced interferometer into the cyclical electrical signal.

14. The method as recited in claim 11 wherein the generating step comprises the steps of:
inputting the swept optical output to a polarizer;
coupling a highly birefringent section of fiber at one end to an output of the polarizer, the polarizer being oriented at forty-five degrees with respect to the eigen modes of the fiber;
coupling a polarizing beam splitter to the other end of the highly birefringent section of fiber, the polarizing beam splitter being oriented at forty-five degrees to the eigen modes of the fiber and having a pair of output;
deriving from the pair of outputs of the polarizing beam splitter the electrical signal as a composite of the pair of outputs.

15. The method as recited in claim 11 wherein the providing step comprises the steps of:
inputting the swept optical output to a gas absorption cell containing a material having known absorption spectral lines within the defined optical wavelength range; and
detecting from an output of the gas absorption cell the known absorption spectral lines as the calibration reference.

16. The method as recited in claim 15 wherein the material comprises a gas including acetylene or hydrogen cyanide.

17. The method as recited in claim 15 wherein the deriving step comprises the step of differencing the pair of outputs from the polarizing beam splitter to form the composite as the electrical signal.

18. The method as recited in claim 15 further comprising the step of calibrating the electrical signal with respect to wavelength using the calibration reference.

19. The method as recited in claim 18 wherein the calibrating step comprises the step of interpolating between known spectral absorption lines of the calibration reference the calibration of the electrical signal.

20. The method as recited in claim 19 wherein the calibrating step further comprises extrapolating, from the known spectral absorption lines of the calibration reference, the calibration of the electrical signal.

21. A swept wavelength meter including a real-time wavelength calibration system for a swept laser comprising:
a processor that generates from a swept optical output of the swept laser an electrical signal that is cyclical with optical wavelength for the swept laser over a defined optical wavelength range such that the wavelength corresponding to each point of the electrical signal is accurately known;
wherein said processor provides from the swept optical output a calibration reference for the electrical signal using known spectral absorption lines; and
wherein, essentially simultaneous to the provision of said calibration reference, said processor obtains from the swept optical output a normalizing measurement of forward energy.

22. The swept wavelength meter as recited in claim 21 further comprising:
- an unbalanced interferometer with two optical paths of unequal length having the swept optical output from the swept laser as an input; and
- a processing component wherein an optical output from the unbalanced interferometer is converted into the cyclical electrical signal.

23. The swept wavelength meter as recited in claim 21 further comprising:
- a polarizer having as an input the swept optical output from the swept laser;
- a highly birefringent section of fiber coupled at one end to an output of the polarizer such that the polarizer is oriented at forty-five degrees with respect to the eigen modes of the fiber;
- a polarizing beam splitter coupled to the other end of the highly birefringent section of fiber oriented at forty-five degrees with respect to the eigen modes of the fiber; and
- a pair of detectors, one coupled to each output of the polarizing beam splitter, to generate respective output electrical signals, the composite of which is the electrical signal.

24. The swept wavelength meter as recited in claim 21 further comprising:
- a gas absorption cell containing a gas having known spectral absorption lines within the defined optical wavelength range, the gas absorption cell having an input coupled to receive the swept optical output from the swept laser; and
- a detector for converting the known spectral absorption lines from the gas absorption cell into the calibration reference.

25. The swept wavelength meter as recited in claim 24 wherein the gas in the gas absorption cell includes acetylene or hydrogen cyanide.

26. The system as recited in claim 24 wherein the composite of the respective output electrical signals comprises the difference of the respective output electrical signals as the electrical signal.

27. The swept wavelength meter as recited in claim 21 further comprising means for calibrating the electrical signal with respect to wavelength using the known spectral absorption lines.

28. The swept wavelength meter as recited in claim 27 wherein the calibrating means comprises means for interpolating, between the known spectral absorption lines, the calibration of the electrical signal.

29. The swept wavelength meter as recited in claim 28 wherein the calibrating means further comprises means for extrapolating, from the known spectral lines, the calibration of the electrical signal.

* * * * *